(12) United States Patent
Prus et al.

(10) Patent No.: US 10,556,255 B2
(45) Date of Patent: Feb. 11, 2020

(54) AUTOMATIC CLEANING PROCESS, DRYING STATION AND CLEANING SYSTEM COMPRISING SUCH DRYING STATION

(71) Applicant: EXEL INDUSTRIES, Epernay (FR)

(72) Inventors: Eric Prus, Paris (FR); Cyrille Medard, Paris (FR); Philippe Provenaz, Paris (FR)

(73) Assignee: EXEL INDUSTRIES, Epernay (FR)

( * ) Notice: Subject to any disclaimer, the term of this patent is extended or adjusted under 35 U.S.C. 154(b) by 237 days.

(21) Appl. No.: 15/630,680

(22) Filed: Jun. 22, 2017

(65) Prior Publication Data
US 2017/0368579 A1 Dec. 28, 2017

(30) Foreign Application Priority Data

Jun. 28, 2016 (FR) ...................................... 16 56024

(51) Int. Cl.
| | |
|---|---|
| *B08B 13/00* | (2006.01) |
| *B08B 3/02* | (2006.01) |
| *B05B 14/41* | (2018.01) |
| *B05B 15/555* | (2018.01) |
| *B05B 15/52* | (2018.01) |
| *B08B 5/02* | (2006.01) |

(Continued)

(52) U.S. Cl.
CPC .............. *B08B 3/02* (2013.01); *B05B 14/41* (2018.02); *B05B 15/52* (2018.02); *B05B 15/555* (2018.02); *B08B 1/002* (2013.01); *B08B 1/04* (2013.01); *B08B 3/024* (2013.01); *B08B 3/08* (2013.01); *B08B 3/14* (2013.01); *B08B 5/02* (2013.01); *B08B 9/00* (2013.01); *B25J 11/0085* (2013.01); *F26B 9/06* (2013.01); *F26B 25/003* (2013.01); *B05B 13/0452* (2013.01); *B05B 16/00* (2018.02); *B05B 16/40* (2018.02); *B08B 9/093* (2013.01)

(58) Field of Classification Search
None
See application file for complete search history.

(56) References Cited

FOREIGN PATENT DOCUMENTS

| | | |
|---|---|---|
| DE | 41 29 778 A1 | 7/1992 |
| DE | 10 2012 014212 A1 | 1/2014 |

(Continued)

OTHER PUBLICATIONS

EPO machine translation of DE4129778 to Daimler (Year: 2019).*
Search Report issued for French patent application No. 165604, dated Mar. 7, 2017, 2 pages.

*Primary Examiner* — Eric W Golightly
(74) *Attorney, Agent, or Firm* — Duane Morris LLP

(57) ABSTRACT

The invention relates to an automatic cleaning process, carried out during cleaning sequences during which all or at least part of an element to be cleaned is cleaned, each element to be cleaned being positioned inside a controlled atmosphere booth belonging to a coating facility. The cleaning sequences of the element(s) are programmed during imposed production stoppages of the facility.

The invention also relates to a drying station, intended to be positioned inside a booth with a controlled atmosphere belonging to a coating facility, this drying station being dimensioned to receive all or part of a spraying robot, comprising a moving arm at the end of which a handle and a sprayer attached on the handle are provided.

8 Claims, 4 Drawing Sheets

(51) Int. Cl.
  *B08B 9/00* (2006.01)
  *B25J 11/00* (2006.01)
  *B08B 1/00* (2006.01)
  *B08B 1/04* (2006.01)
  *B08B 3/08* (2006.01)
  *B08B 3/14* (2006.01)
  *F26B 9/06* (2006.01)
  *F26B 25/00* (2006.01)
  *B05B 16/40* (2018.01)
  *B05B 16/00* (2018.01)
  *B05B 13/04* (2006.01)
  *B08B 9/093* (2006.01)

(56) References Cited

FOREIGN PATENT DOCUMENTS

| | | |
|---|---:|---|
| DE | 10 2012 018940 A1 | 3/2014 |
| JP | 3 050034 B2 | 6/2000 |
| WO | 02/078858 A1 | 10/2002 |
| WO | 2009/046952 A1 | 4/2009 |
| WO | 2017/033074 A1 | 3/2017 |

\* cited by examiner

AUTOMATIC CLEANING PROCESS, DRYING STATION AND CLEANING SYSTEM COMPRISING SUCH DRYING STATION

BACKGROUND OF THE INVENTION

The present invention relates to an automatic cleaning process, carried out during cleaning sequences during which all or at least part of an element to be cleaned, such as a spraying robot, is cleaned. Each element to be cleaned is positioned inside a booth with a controlled atmosphere belonging to a coating facility, such as an automotive paint facility. In a known manner, a painting booth comprises a conveyor to move the parts to be painted, such as automotive vehicle bodies, and one or several spraying robots of the multiaxial type, which are positioned on the side of the conveyor. The spraying robot(s) are supported by a grating or suspended from a vertical structure.

Generally, the air in a painting booth is regulated in terms of temperature and hygrometry to ensure good application of the paint on the surface to be painted. This dual regulation requires treatment of the outside air involving successive cooling and heating steps of the air to bring the air to a certain temperature and a certain humidity level. This air treatment creates high energy consumption and $CO_2$ discharge into the atmosphere.

To resolve this drawback and thus comply with the environmental standards applicable to automobile manufacturing plants, it is known to recycle the air from the booth. In practice, ventilation of a modern booth operates with 90 to 100% recycled air.

The average transfer rate for application of the coating product is comprised between 70% and 80%: part of the sprayed paint is therefore not deposited on the surface to be painted. This lost paint is commonly called "overspray" in the coating field.

Part of the overspray can be recovered in a filtration system positioned in the lower part of the booth, below the grating. To that end, a ventilation system is used to generate a vertical stream of air directed from top to bottom, which makes it possible to guide the drops of paint toward the filtration system. Typically, the filtration system comprises a washer having a water reserve in the case of a traditional washer or a powder reserve in the case of a dry washer. This water or powder reserve is intended to absorb the drops of paint from the overspray. The filtration system therefore makes it possible to separate the air and the drops of paint, and to reuse the air for ventilation.

The other part of the overspray is deposited on the equipment installed in the booth, such as the sprayers and the robots, and optionally on the walls of the booth itself. The drops of paint deposited on the equipment thus risk building up and, over time, falling on the surface to be painted. Finishing defects may then appear on the bodies. Such defects require a partial or total touchup of the coated surface.

Thus, the equipment in the booth must be cleaned periodically. In practice, production stoppages are arranged to that end with a frequency of 2 to 4 hours for coating the inner parts of the body and frequency of 4 to 8 hours for coating the outer parts. During production stoppages, the operators enter the inside of the booth with cloths imbibed with solvent and manually clean the booth equipment. However, these operations are costly in terms of personnel. Furthermore, if the air in the booth is recycled, it nevertheless remains polluted with volatile organic compounds (VOC), such as solvent vapors, which are harmful to operators' health. The operators must therefore protect themselves with specific equipment, which is cumbersome and hinders their mobility.

To offset these drawbacks, some booths comprise an automatic cleaning system, comprising a rinsing box. This automatic cleaning system operates each time there is a change of the vehicle in the work zone of the robot and/or upon each change of color. The multiaxial robots bearing sprayers are then moved inside the rinsing box installed on the edge of the booth and are cleaned by applying a liquid solvent. The robots are next dried by one or several air jets. The rinsing box therefore also serves as a drying box. This limits the space occupied inside the booth, but does not allow effective drying of the solvent applied on the surfaces of the sprayer.

In practice, the time needed to change colors and the time to change vehicles in the coating product application zone, which depends on the production rhythm, are very short, such that the time allocated for cleaning is also very short, around 10 seconds, which does not allow in-depth cleaning of the outer surfaces of the painting equipment. Indeed, a large portion of this period is dedicated to drying, in order to avoid polluting the surfaces of the body with solvent. Thus, the current cleaning systems are only designed to clean the end of the head of the sprayer. This is for example the case for the systems described in WO-A-97/18903 and WO-A-2015/169432.

Thus, the other parts of the sprayer, such as the cover or the body on which the skirt is fastened, are not cleaned. Furthermore, certain parts of the robot itself, such as the handle, are not cleaned. These uncleaned parts therefore remain stained with coating product, which may drip on the surface to be painted during the application of the product and thereby create finishing defects.

Some rinsing boxes have nozzles that are movable along an axis, which makes it possible to rinse a larger surface area and reduce the number of injectors.

Furthermore, other solutions have been implemented to increase the time allocated cleaning. One solution consists of positioning the rinsing box as close as possible to the position of the robot at the end of application of the product. Another solution consists of using a set of two sprayers. While the first sprayer is working, the other sprayer is cleaned. One then has a longer period dedicated to cleaning, around 40 to 50 seconds. When the vehicle is changed, the "dirty" sprayer is then replaced with the "clean" sprayer standing by. In the same spirit, only the cover of the sprayer may be replaced when changing vehicles.

However, these solutions are not satisfactory, since they do not make it possible to obtain an optimal cleaning quality of the dirty painting equipment during application of the coating. Indeed, the component parts of the sprayers are parts with a complex geometry having many recesses, which makes them difficult to clean. Furthermore, all of these recesses form potential liquid solvent retention zones, which must be dried for a long time, since they may allow accumulated solvent residues to escape. Yet the time allocated to cleaning is too short to guarantee perfect drying of the rinsed surfaces.

SUMMARY OF THE INVENTION

The invention more particularly aims to resolve these drawbacks by proposing an automatic cleaning process with which the surfaces of the sprayer are better cleaned.

To that end, the invention relates to an automatic cleaning process, carried out during cleaning sequences during which all or at least part of an element to be cleaned is cleaned, each element to be cleaned being positioned inside a controlled atmosphere booth belonging to a coating facility. According to the invention, the cleaning sequences of the element(s) are programmed during imposed production stoppages of the facility.

Unlike the existing processes, the cleaning sequences are programmed during imposed production stoppages, for example during personal breaks and/or team changeovers. This makes it possible to take advantage of imposed production stoppages to clean the painting equipment. There are therefore no production stoppages other than the production stoppages imposed by personnel constraints. Thus, the cleaning operations do not deteriorate the economic profitability of the painting facility. Furthermore, the time allocated to cleaning is longer than the time allocated in the current processes, substantially corresponding to the color change time or the time interval needed to change vehicles in the work area of the robots. Thus, if the element to be cleaned is a spraying robot, of the multiaxial type, the sprayer of the robot can be cleaned in greater detail. In practice, the entire surface area of the sprayer can be cleaned, which is not possible with the existing automatic processes.

Furthermore, there is no human intervention inside the booth. Operators are therefore no longer responsible for performing this unpleasant task, and are also less exposed to the toxic solvent vapors inside the booth. Lastly, the automatic aspect of the cleaning means that it is reproducible and controlled, which ensures an identical finishing quality for all vehicles.

According to advantageous, but optional aspects of the invention, such a process may include one or more of the following features, considered in any technically allowable combination:

- Each cleaning sequence comprises a step for rinsing all or part of each element to be cleaned and/or a step for drying all or part of each element to be cleaned.
- The part of each element to be cleaned is moved between the rinsing step and the drying step.
- During each cleaning sequence, each element to be cleaned is cleaned by a dedicated robot and/or by a spraying robot and/or by a handling robot.
- The element to be cleaned is a multiaxial robot, comprising a moving arm at the end of which a handle and a sprayer attached on the handle are provided, and in that the part of the element to be cleaned includes the sprayer and/or the handle and/or part of the arm.
- The cleaning sequences each last more than 1 minute, such that the entire surface area of the sprayer can be cleaned.
- During cleaning sequences, the sprayer and/or the handle and/or the arm part of the robot is dried inside a sheath defining an air passage duct.
- During drying, the sprayer and/or the handle and/or the arm part of the robot is immobile.
- A spraying robot and/or a dedicated robot and/or a handling robot is used to clean the walls of the booth during at least one of the cleaning sequences.

The invention also relates to a drying station, intended to be positioned inside a booth with a controlled atmosphere belonging to a coating facility. The drying station is dimensioned to receive all or part of a spraying robot, comprising a moving arm at the end of which a handle and a sprayer attached on the handle.

Advantageously, the drying station comprises a sheath defining an air passage duct inside which all or part of the spraying robot can be positioned.

Advantageously, the sheath has a minimum section larger than 350 mm$^2$.

The invention also relates to an automatic cleaning system comprising at least one nozzle for applying a liquid solvent on all or part of the spraying robot, and a drying station as previously described. The entire surface of the sprayer can be exposed, at least temporarily, to a liquid solvent jet applied by the nozzle or by one of the nozzles.

According to advantageous, but optional aspects of the invention, such a system may include one or more of the following features, considered in any technically allowable combination:

- The nozzle is mounted on an adjacent robot.
- Each nozzle belongs to a rinsing station, dimensioned to receive the sprayer completely, the rinsing station preferably being shared by several spraying robots.
- The rinsing station may comprise a roller.
- The drying station and the rinsing station are separate. Thus, the drying station and the rinsing station equipped with nozzles are independent of one another. The rinsing station can therefore be provided to be relatively bulky to allow the robot to move, while the drying station can be chosen to be compact so as to avoid an underpressure and obtain effective drying. Each cleaning station is therefore dimensioned based on its own objectives. The cleaning system formed by a rinsing station and a separate drying station therefore proves more effective.
- The drying station comprises a sheath defining an air passage duct inside which the spraying robot can be positioned.
- The rinsing station comprises an enclosure, defining an opening for the passage of the sprayer, and the section of the enclosure is larger than the section of the sheath.
- The system comprises a means for recovering the used liquid solvent and a pump for reinjecting the used liquid solvent inside a supply circuit of the nozzle(s).

BRIEF DESCRIPTION OF THE DRAWINGS

The invention and other advantages thereof will appear more clearly in light of the following description of two embodiments of a cleaning system according to its principle, provided solely as an example and done in reference to the appended drawings, in which:

FIGS. 1 to 3 show a first embodiment of a system 2 for automatically cleaning a robot spraying paint inside a booth C with a controlled atmosphere, this booth being shown only in FIG. 1 by part of its partitions.

DETAILED DESCRIPTION

Figure 1:
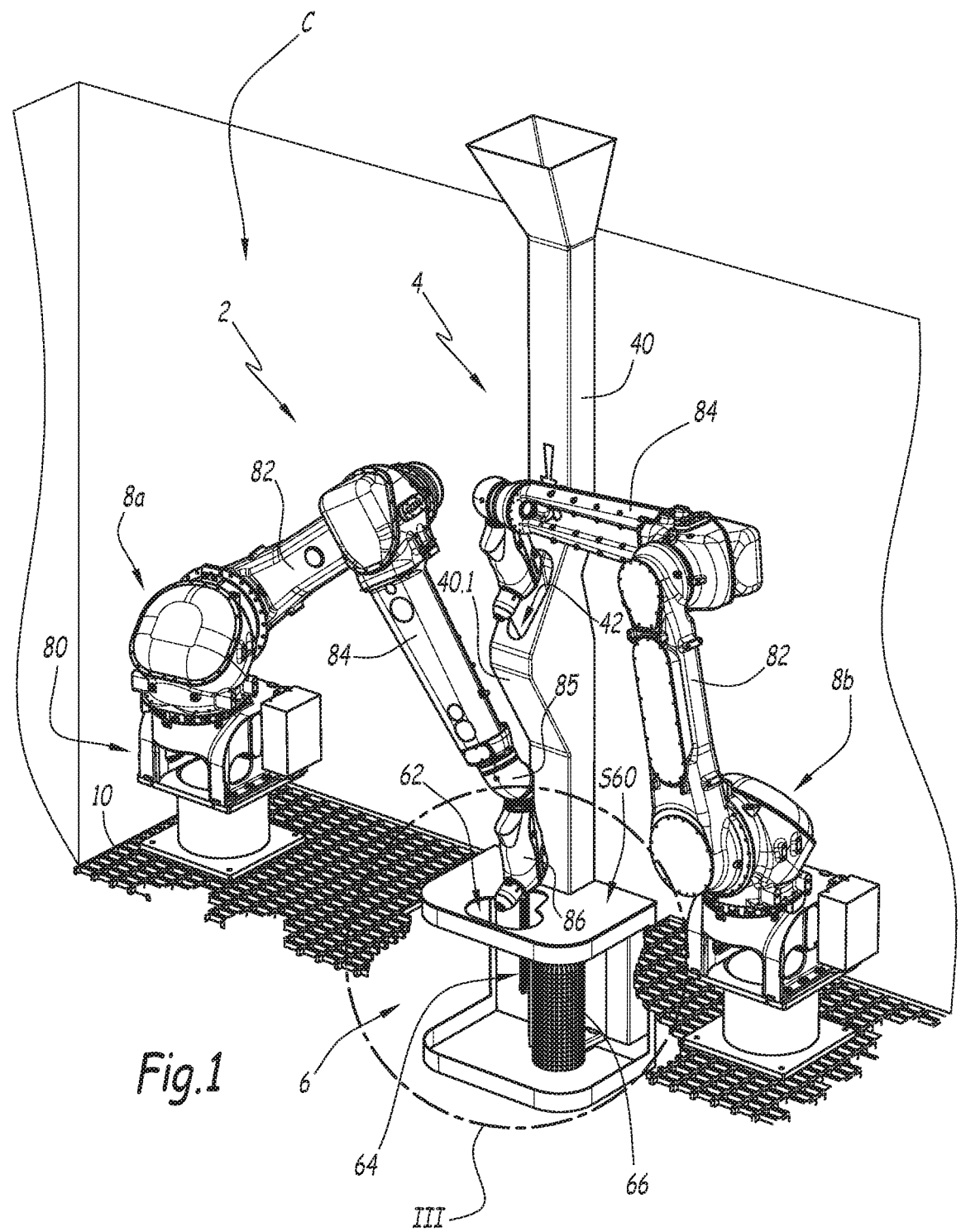
FIG. 1 is a perspective view of the inside of a painting booth showing two spraying robots and a cleaning system according to the invention, the two robots being shown in a first configuration during a cleaning sequence.

In the example, the cleaning system 2 is shared by several spraying robots, in particular two spraying robots 8a and 8b, respectively. The spraying robots 8a and 8b and the booth belong to a coating facility. The spraying robots 8a and 8b are multiaxial robots that are mounted on a grating 10 and that are intended to apply a coating product on a surface to be painted, such as a motor vehicle body moved along a conveyor, not shown. The robots 8a and 8b each comprise a base 80 fastened to the grating 10, a first arm 82 articulated on the base 80 and a second arm 84 articulated with the first arm 82. The arm 84 includes, at its free end, a handle 85 on which a sprayer 86 is fastened.

The sprayer 86 comprises a body 86.1 and a skirt 86.2 for guiding air. In the example, the sprayer 86 also comprises a rotary bowl 86.3 positioned inside the skirt 86.2. The coating product is discharged between the skirt and the bowl.

Figure 3:
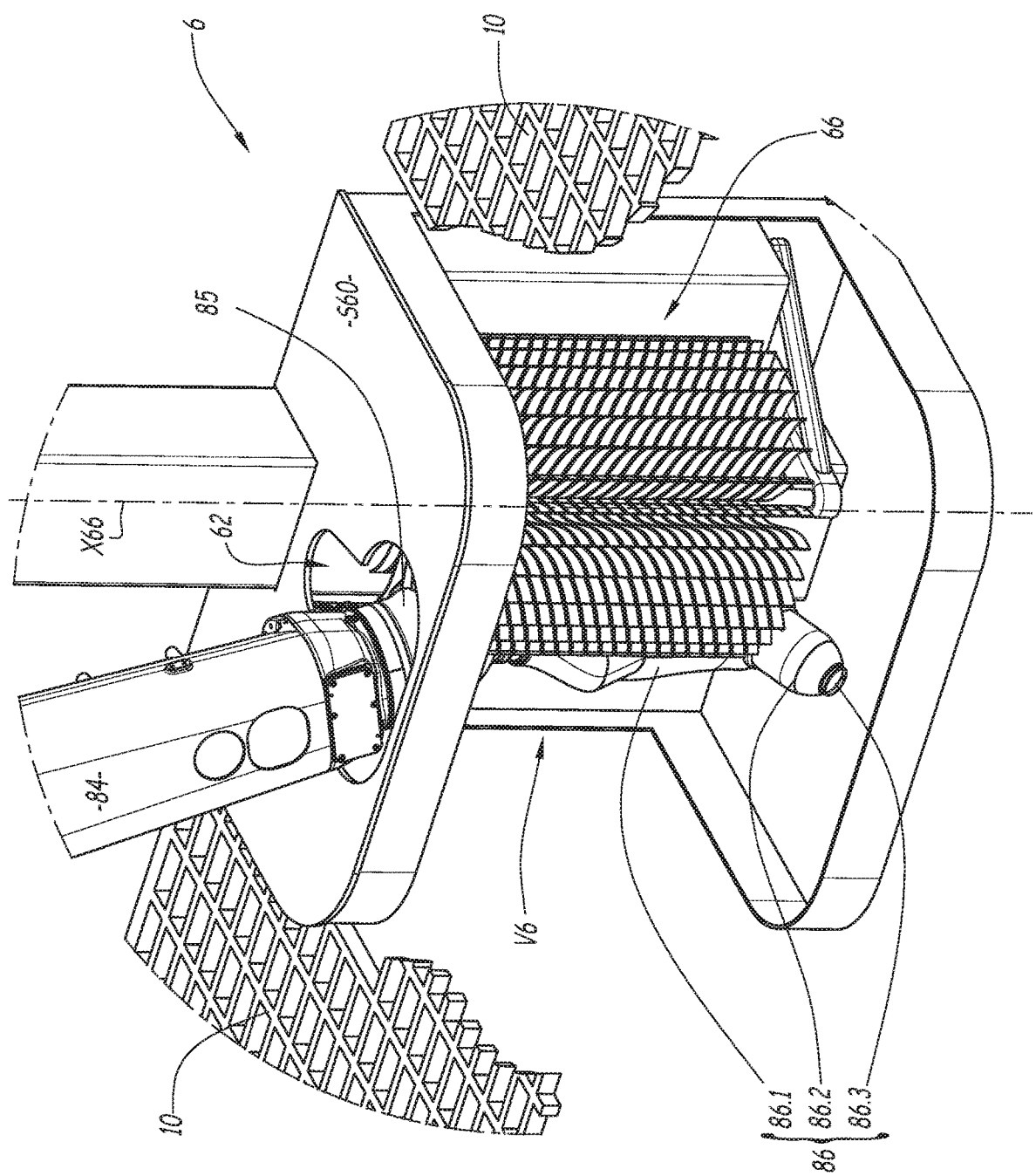
FIG. 3 is a perspective view of a rinsing station belonging to the cleaning station of FIGS. 1 and 2, this rinsing station being shown without its peripheral wall to facilitate the viewing of the components inside the rinsing station, as shown in the circled zone III of FIG. 1.

As shown in FIGS. 1 and 3, the system 2 comprises a rinsing station 6 that is stationary inside the booth. Advantageously, the rinsing station 6 comprises a closed enclosure 60 defining an opening 62 for the passage of the sprayer 86. The fact that the rinsing station comprises a closed enclosure makes it possible to prevent splashing inside the booth C. The latter may then be equipped with a dry washer not tolerating liquid residues.

In the example, the opening 62 is delimited over an upper surface S60 of the closed enclosure 60. The rinsing station 6 is equipped with a nozzle 64 for spraying a liquid solvent. Advantageously, the rinsing station 6 comprises several nozzles 64 aligned along a vertical direction. The advantage of using a closed enclosure is that it is possible to recover the liquid solvent.

In the example, the liquid solvent is a chemical solvent. However, alternatively, water, optionally with additives, can be used as liquid solvent.

Advantageously, the nozzles 64 spray an air-solvent mixture, which makes it possible to save on the quantity of solvent used for rinsing.

The speed of the jet produced by each nozzle 64 is configurable. In practice, it is adjusted based on the geometry of the part to be rinsed. The speed of the jet is even greater for a hard-to-clean surface, such as a recess. In the example, the impact speed of each jet can reach 20 m/s. Thus, the solvent droplets have a high kinetic energy favoring the loosening of paint spots present on the surfaces of the sprayer. In other words, the chemical effect of the solvent is combined with a mechanical effect related to the power of the jets. This is referred to as "spray" with high mechanical efficiency. This type of spray has the advantage that less toxic, and also less expensive, solvents can be used.

In the example, the nozzles 64 are stationary. However, as an alternative that is not shown, they can be translatable, for example in the vertical direction.

As shown in FIG. 3, the rinsing station 6 is also equipped with a cleaning roller 66. This cleaning roller 66 is a roller with flexible brushes that is intended to pivot around a vertical axis X66 during cleaning of the sprayer. The roller 66 makes it possible to detach any paint residues not dissolved by the spray.

As an alternative that is not shown, the rinsing station 6 is arranged such that the brushes of the roller 66, then dirtied with paint, can be rinsed by the nozzles 64.

The rinsing station 6 defines a volume V6 sized to receive the entire sprayer 86 as well as the end of the articulated arm 84 of the robot 8a or 8b. Furthermore, the volume V6 defined by the enclosure 60 is fairly large so that the sprayer 86 can describe a three-dimensional trajectory in this volume. All of the surfaces of the sprayer 86 can therefore be exposed to the jets of the solvent nozzles 64. Thus, the cleaning station 2 is capable of cleaning all of the surfaces of the sprayer 86.

The volume V6 is comprised between 125 L and 1000 L. As a comparison, the rinsing boxes of the prior art instead have a volume of about 96 L.

Advantageously, the height of the enclosure 60 is such that the handle 85 of each of the robots 8a and 8b can also penetrate inside the enclosure 60 and be cleaned by the solvent nozzles 64 and by the roller 66.

The rinsing station 6 cleverly comprises a means for recovering the used liquid solvent. In the example, this means is a collector, not shown, positioned in the lower part of the rinsing station 6. The system 2 further comprises a pump, not shown, for reinjecting the used liquid solvent inside the supply circuit of the nozzles 64. Indeed, the injection of "dirty" solvent is sufficient to rinse the surfaces of the sprayer, since the solvent, even with traces of paint, continues to exert a chemical action. However, in order not to leave traces of solvent charged with paint on the surfaces of the sprayer 86, clean solvent is used at the end of the cycle. This process allows several reuses of the liquid solvent used for rinsing, which limits solvent consumption.

The system 2 further comprises a drying station 4. In the example, the drying station 4 is separate from the rinsing station 6. The drying station 4 makes it possible to dry the liquid solvent applied on the surfaces of the sprayer 86 to prevent the solvent from dripping on the surfaces to be painted.

The drying station 4 has only one function: drying. Thus, the drying station 4 has no rinsing nozzle able to allow rinsing of the elements received inside the drying station 4, for example by applying a liquid solvent.

Advantageously, the drying station 4 comprises a vertical sheath 40 defining an air passage duct inside which the sprayer 86 and the end of the arm of a robot from among the robots 8a and 8b can be positioned to be dried. To that end, the sheath 40 defines an opening 42 for the passage of the sprayer 46.

The sheath 40 comprises a part 40.1 defining an inner volume with a larger section than the rest of the sheath 40. This volume, which is accessible to the sprayer 86 through the opening 42, is large enough to receive the entire sprayer 86, as well as the handle 85 of the robot.

The sheath 40 is designed to guide a significant air flow rate, at a low pressure, in particular at a pressure below or equal to 2 bar. In particular, the sheath 40 has a minimal section greater than or equal to 350 mm$^2$. Typically, the air flow rate circulating in the sheath 40 is comprised between 1000 m$^3$/h and 2000 m$^3$/h, for example around 1500 m$^3$/h. Thus, the speed of the air circulating around the sprayer 86 during drying is comprised between 10 m/s and 20 m/s in the passage section in question, which ensures effective drying. In the example, the air circulates inside the sheath 40 from top to bottom.

The sheath 40 is cleverly connected to the ventilation system of the booth C used to recover the overspray. This makes it possible to eliminate the use of a fan and thereby save electricity. The drying station therefore uses part of the air used for the ventilation of the booth.

In an alternative that is not shown, the air used for drying comes from outside the booth. A fan or an electric air extractor is then arranged at one end of the sheath 40 to create an underpressure or an overpressure inside the sheath 40 and to form an air passage inside the latter.

Advantageously, the section of the enclosure 60 in a horizontal plane is larger than the section of the sheath 40 in a horizontal plane. Indeed, it is not necessary to move the sprayer 42 inside the sheath 40 to ensure complete drying of the surfaces of the sprayer 86. In other words, the sprayer 86 remains immobile during drying. The sheath 40 therefore defines a minimal space to receive the sprayer 86. Thus, the section of the sheath 40 is as small as possible, which makes it possible to keep the air circulating in the sheath pressurized and consequently obtain effective drying. Conversely, the enclosure is larger in order on the one hand not to hinder the movements of the sprayer 86 during rinsing, and on the other hand to prevent the surfaces of the sprayer from becoming dirty by bouncing or splashing.

The cleaning of the spraying robots 8*a* and 8*b* is done periodically. For example, the cleaning of the spraying robots 8*a* and 8*b* can be done every four hours when the robots 8*a* and 8*b* are used to paint the outside of the automobile body. Conversely, when the spraying robots 8*a* and 8*b* are used to paint the inside of a vehicle, for example the inside of a van, the spraying robots become dirtier and therefore need to be cleaned more frequently. An appropriate frequency in this case is about every two hours.

The cleaning sequences of the sprayer are programmed during imposed production stoppages of the coating facility. These production stoppages are for example arranged during personal breaks and/or team changeovers. The time allocated for cleaning is therefore longer than during a change of color or change of vehicle. In practice, for one robot, a cleaning sequence lasts between 1 min. and 4 min., and in particular approximately 3 min. For two robots, like in the example, the cleaning sequence lasts between 3 min. and 6 min., and in particular approximately 5 min. In all cases, each cleaning sequence lasts at least 1 minute.

During a cleaning sequence, a first robot among the robots 8*a* and 8*b* moves so as to insert its sprayer 86 inside the opening 62 of the rinsing station 6. In the example, this is the spraying robot 8*b*. Once the sprayer 86 is completely engaged inside the enclosure 60, the nozzles 64 spray a liquid solvent toward the sprayer 86 of the spraying robot 8*b* and the roller 66 is started.

Advantageously, the sprayer 86 describes, inside the enclosure 60, a pre-established three-dimensional trajectory combining translation and rotation movements, such that the entire surface of the sprayer 86 can be exposed, at least temporarily, to a liquid solvent jet applied by one of the nozzles 64. This trajectory is repeated during each cleaning sequence.

Thus, all of the hard-to-clean recesses, even manually by an operator, can be reached by the jet from the nozzles 64. The rinsing cycle is adjusted such that the liquid solvent is not sprayed under pressure directly in sensitive zones normally sealed against the passage of a cloth imbibed with solvent, like the interstitial spaces between the surfaces of the sprayer 86 and the surfaces of the robot.

The rinsing cycle is developed upstream and its efficacy has been tested beforehand. This means that the trajectory of the sprayer 86 is pre-established, like the configuration of the nozzles 64 in terms of pressure and flow rate. This automatic cycle is reproducible and reliable, i.e., it guarantees a constant result during each cleaning cycle.

Also during the rinsing cycle, the brush 66 is rotated and rubs against the surfaces of the sprayer 86 in order to detach any paint residues that have withstood the injection of liquid solvent by the nozzles 64. The rinsing station therefore combines a chemical action exerted by the liquid solvent with a mechanical action exerted by the brush 66. This combined action allows the effective removal of all paint residues attached to the surfaces of the sprayer 86.

Figure 2:
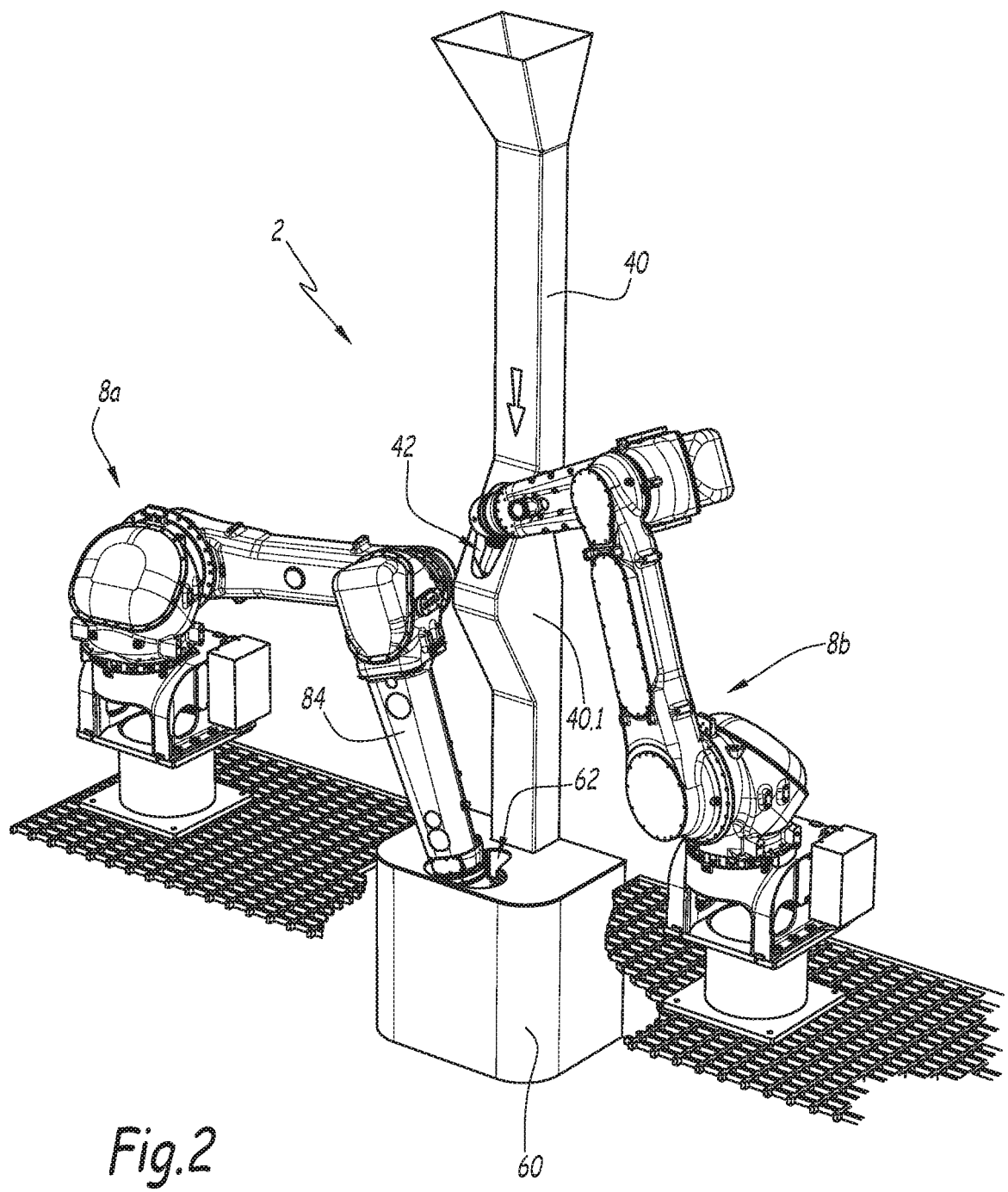
FIG. 2 is a view similar to FIG. 1, in which the two spraying robots are shown in a second configuration during the cleaning sequence.

Once the sprayer 86 is clean, i.e., the surfaces of the sprayer are stripped of paint, the spraying robot moves to free the sprayer 86 outside the enclosure 60. The spraying robot 8*b* next moves toward the drying station. In parallel, the other robot, i.e., the spraying robot 8*a*, moves so as to bring it sprayer 86 close to the rinsing station 6: this is the configuration of FIG. 1. The sprayer 86 of the robot 8*a* then penetrates the enclosure 60 to be rinsed therein, while the sprayer 86 of the robot 8*b* penetrates through the opening 42 inside the sheath 40 in the space defined to that end. While the sprayer 86 of the robot 8*a* is rinsed, the sprayer 86 of the robot 8*b* is dried: this is the configuration of FIG. 2. Advantageously, the robot 8*b* remains immobile during the drying.

Once the sprayer 86 of the robot 8*b* is completely dried, i.e., there are no longer any traces of liquid solvent on the surfaces of the sprayer 86, the sprayer 86 is removed from the sheath 40: the spraying robot 8*b* is once again operational. It is then time for the spraying robot 8*a* to be dried. At the end of the drying of the spraying robot 8*a*, the cleaning sequence is complete.

In the example, each cleaning sequence comprises a step for rinsing all or part of each element to be cleaned and a step for drying all or part of each element to be cleaned. However, each of these steps is optional. Thus, alternatively, the rinsing step and the drying step can be replaced by a "mechanical" cleaning step during which the paint residues are detached by a mechanical cleaning member, such as an automatic roller or a motorized brush.

In an alternative that is not shown and that is applicable to the first embodiment, the drying station 4 and the rinsing station 6 are a same cleaning station. Thus, the sprayer can be dried immediately after rinsing and does not risk soiling the booth with liquid solvent during the transfer between the rinsing station and the drying station, which is particularly suitable for paint booths equipped with a "dry" washer that does not tolerate any liquid solvent discharge in the booth. This type of washer has the advantage of saving energy. Since no liquid solvent discharge is tolerated, the liquid solvent is collected in order to avoid leaks in the booth. Advantageously, the collection of the liquid solvent can be done by suction, which makes it possible to dry the sprayer at the same time. For example, a cyclone air-liquid separator can be used.

According to another alternative that is not shown and that is applicable to the first embodiment, the rinsing station 6 does not comprise an enclosure 60. This alternative is possible only in the case where the booth is equipped with a traditional washer capable of absorbing liquid solvents, since there is a risk of splashing.

According to another alternative that is not shown, the coating facility comprises one or several additional robots, called substitution robots. Substitution robots can be provided for each robot or for only some robots of the facility. A substitution robot allows the immediate replacement of a robot that breaks down. As a general rule, a spraying robot is dedicated to coating a specific zone of a vehicle, such the hood, the roof or a door. In the example, each of the robots is multifunctional and can be programmed so as to paint the zones adjacent to that which is assigned to it. The substitution robots do not intervene only in case of breakdown. Indeed, during normal operation, the substitution robot periodically replaces the primary robot. This makes it possible to prevent a robot from being in standby mode for too long. One thus ensures that the robot will be operational in case of failure and that there will be no surprises when the backup robot must intervene. During the time interval where it is in standby mode, the robot can then be cleaned and dried, without interrupting the production line. During a switchover, the robot that was in standby mode then comes back clean, which is an additional quality guarantee.

According to another alternative that is not shown and that is applicable to the first embodiment, the rinsing station 6 can be designed to receive a larger part of the robot so as for example to clean at least part of the articulated arm 84.

Figure 4:
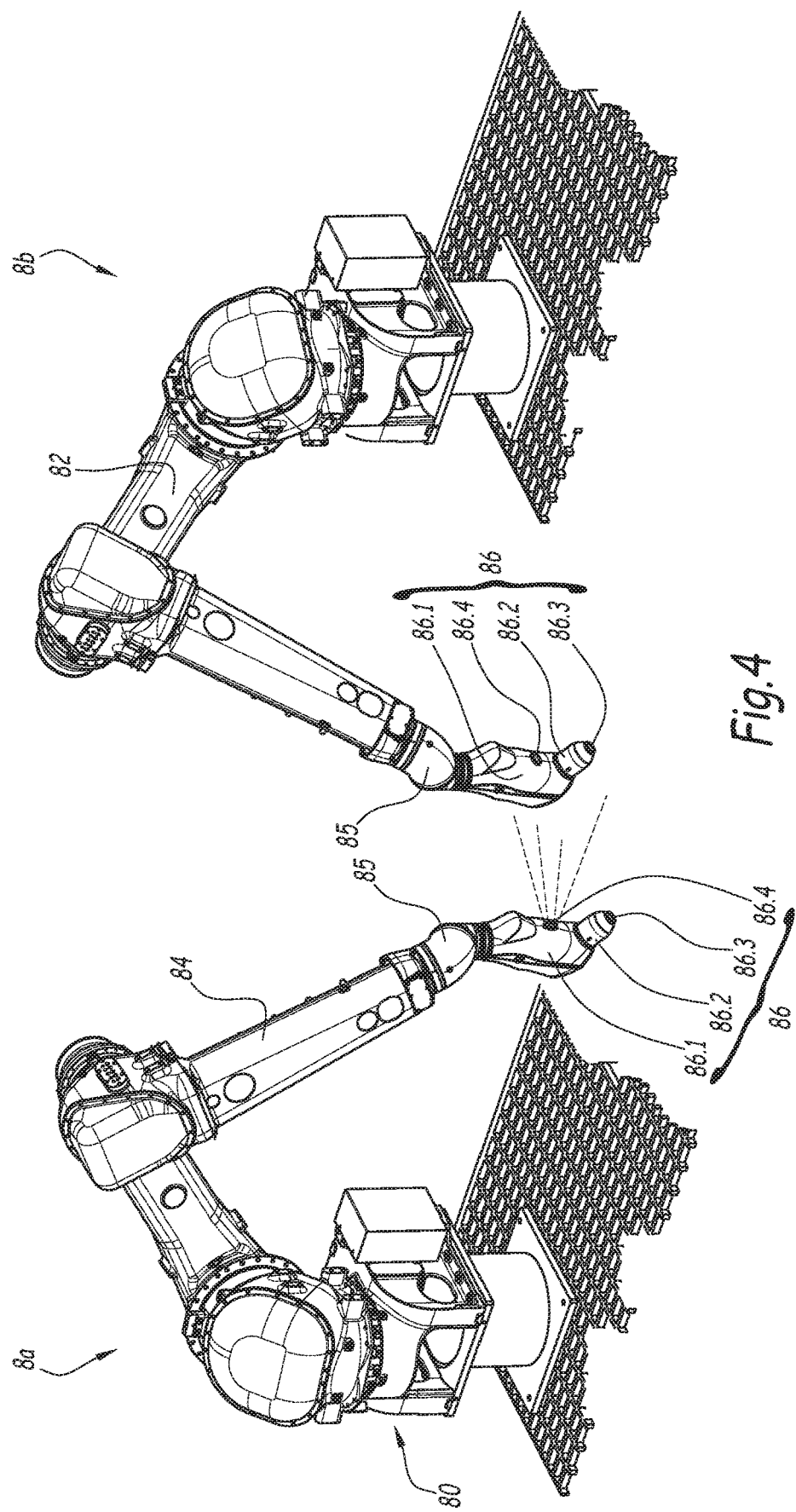
FIG. 4 is a perspective view of a cleaning system according to a second embodiment of the invention, this system using two separate spraying robots, which are able to clean one another.

FIG. 4 shows a second embodiment of a cleaning station according to the invention. Below, only the differences with respect to the first embodiment are mentioned in the interest of concision. Furthermore, the elements similar or identical to those of the first embodiment retain their numerical references, while the other elements bear other numerical references.

The system according to this second embodiment is specific in that it comprises two nozzles 86.4 for spraying a liquid solvent, respectively mounted on two separate spraying robots 8a and 8b, the two robots 8a and 8b then being able to clean one another. The sprayer 86 of each robot therefore comprises two spraying heads, among which one head is dedicated to spraying paint while the other head is dedicated to spraying liquid solvent. The robots 8a and 8b are then multitasking: their primary task is spraying, and their secondary task is cleaning. Alternatively, it is possible to consider that these same robots 8a and 8b can be capable of performing other tasks, for example opening a vehicle door, like a handling robot.

During a cleaning sequence, the robot 8a begins by cleaning the robot 8b by using its nozzle 86.4 to spray a liquid solvent on the surfaces of the sprayer 86 of the robot 8b. Once the sprayer 86 of the robot 8b is rinsed, the latter in turn cleans the robot 8a, using its nozzle 86.4. The robots 8a and 8b are next commanded to move their respective sprayers 86 toward a drying station not shown, identical to that of the first embodiment, in order to dry the liquid solvents applied on the surfaces.

In order to rinse the entire surface of the sprayer supported by one or the other of the robots 8a and 8b, the robot that is cleaning describes a pre-established trajectory relative to the robot that is being cleaned. The cleaned robot then remains immobile.

According to an alternative applicable to the second embodiment, during a cleaning sequence, the cleaning robot remains immobile and it is the cleaned robot that describes a pre-established trajectory relative to the solvent nozzle of the cleaning robot.

According to another alternative applicable to the second embodiment, during a cleaning sequence, the two robots describe pre-established trajectories, the trajectory of the cleaning robot then being synchronized, i.e., coordinated, with the trajectory of the cleaned robot.

According to another alternative applicable to the second embodiment, during a cleaning sequence, the robots 8a and 8b clean one another simultaneously.

According to another alternative applicable to the second embodiment, the robots 8a and 8b are able to clean the walls of the booth C. They are in fact capable of spraying liquid solvent with their nozzle 86.4 on the walls of the booth. In the case where the booth C comprises a dry washer, the robots 8a and 8b are equipped with a suction device capable of suctioning the liquid solvent sprayed on the walls of the booth, to prevent it from flowing toward the dry washer, which does not tolerate liquid discharge.

According to another alternative applicable to the second embodiment, one of the spraying robots 8a and 8b is replaced by another type of robot, for example a robot dedicated to cleaning or a handling robot. This other type of robot could then clean the adjacent spraying robot. The handling robots primarily serve to move the parts. In the example, a handling robot could for example be provided on the sides of a spraying robot to open or close the doors and/or the trunk and/or the hood of a motor vehicle body. The handling robot could further, secondarily, clean the painting equipment of the booth, and in particular clean the spraying robot. A robot dedicated to cleaning is a robot whose primary task is cleaning painting equipment. Such a robot could be provided with one or several nozzles for spraying a liquid solvent on the surfaces of the painting equipment to be cleaned. The robot dedicated to cleaning would not need to be cleaned itself, or at least not at the same frequency as the spraying robots or the handling robots. The robot dedicated to cleaning could further clean the walls of the booth. Additionally, at least a spraying robot, a handling robot and a robot dedicated to cleaning could be installed inside the booth.

As an alternative, not shown, applicable to both embodiments, the drying station 4 comprises an air-liquid separator making it possible to recover the drops of liquid solvent that are loosened from the surfaces of the sprayer 86 under the effect of the passage of the air inside the sheath 40. For example, this air-liquid separator can be a separator of the cyclone type positioned in the lower part of the drying station 4, so as to recover the drops of liquid solvent by gravity. Furthermore, this type of separator has the advantage of generating an air vortex around the sprayer 86, which improves the drying efficiency.

As an alternative applicable to both embodiments, the sprayer 86 remains immobile during the rinsing.

According to another alternative that is not shown, only one of the two robots 8a and 8b is cleaned during a cleaning sequence. Likewise, the system 2 can be installed inside a booth having only one spraying robot.

According to another alternative that is not shown, the spraying robots are suspended from a vertical structure. There is then no grating.

According to another alternative that is not shown, the coating facility is equipped to allow a change of spraying tool, for example a change of skirt for a sprayer mounted at the end of the arm of a robot. The tool change makes it possible to use a type of sprayer suitable for each zone of the vehicle to be painted (sprayer with a round jet, flat jet, etc.). An airlock dedicated to changing tools can then be installed on the production line. This airlock would comprise two openings each equipped with a rolling shutter. A first opening would be open to the inside of the booth to provide access to the robots. It is therefore understood that the booth in this case comprises one or several rails making it possible to move the robots inside the airlock in a controlled manner. A second opening would allow an operator to enter the airlock. The airlock is equipped with separate ventilation that is started up on demand. The airlock is ventilated by recycled air in production mode and new air in maintenance mode. The operators thus have the possibility of intervening on the robots for maintenance and/or cleaning operations.

The features of the alternatives and embodiments considered above may be combined with one another to create new embodiments of the invention.

The invention claimed is:

1. An automatic cleaning system intended to be positioned inside a booth with a controlled atmosphere belonging to a coating facility, the automatic cleaning system comprising:
   a rinsing station comprising at least one nozzle for applying a liquid solvent on all or part of a spraying robot, wherein the spraying robot comprises a moving arm, a handle and a sprayer, wherein the handle is attached to an end of the moving arm and the sprayer is attached to the handle, and wherein the rinsing station is dimensioned to receive the sprayer completely, and
   a drying station dimensioned to receive all or part of the spraying robot,
   wherein an entire surface of the sprayer can be exposed, at least temporarily, to a liquid solvent jet applied by the nozzle or by one of the nozzles, and
   wherein the drying station and the rinsing station are separate and comprise separate openings for receiving the sprayer.

2. The automatic cleaning system according to claim 1, wherein the drying station comprises a sheath defining an air passage duct inside which all or part of the spraying robot can be positioned.

3. The automatic cleaning system according to claim 2, wherein the sheath has a cross sectional area larger than 350 mm$^2$.

4. The automatic cleaning system according to claim 1, wherein the nozzle is mounted on an adjacent robot.

5. The automatic cleaning system according to claim 1, wherein the cleaning system is shared by several spraying robots.

6. The automatic cleaning system according to claim 1, wherein the rinsing station further comprises a roller.

7. The automatic cleaning system according to claim 1, wherein the drying station comprises a sheath defining an air passage duct inside which all or part of the spraying robot can be positioned, wherein the rinsing station comprises an enclosure, defining the opening, which is sized to allow for passage of the sprayer therethrough, and wherein a cross sectional area of the enclosure is larger than a cross sectional area of the sheath.

8. The automatic cleaning system according of claim 1, further comprising a supply circuit for the at least one nozzle, a means for recovering used liquid solvent and a pump for reinjecting the used liquid solvent inside the supply circuit.

* * * * *